United States Patent Office 2,768,952
Patented Oct. 30, 1956

2,768,952

COMPOSITION FOR AND METHOD OF EXTINGUISHING LIGHT METAL FIRES

Charles Anthony, Jr., East Orange, and Robert Thomann, Jr., Clifton, N. J., assignors to Specialties Development Corporation, Belleville, N. J., a corporation of New Jersey No Drawing. Application May 5, 1954,
Serial No. 427,856

5 Claims. (Cl. 252—7)

The present invention relates to fire extinguishing compositions, and, more particularly, to a composition for and a method of extinguishing light metal fires, such as fires of aluminum, magnesium or alloys of these metals.

Heretofore, it has been found that sodium chloride is effective to extinguish light metal fires. However, where such fires consist of a mass of light metal particles of about an inch or more in depth, it has been observed that the sodium chloride merely forms a crust on the surface of the mass and does not penetrate to the bottom of the mass, whereby the particles underneath continue to burn or remain very hot, and, upon disturbing the crust, the fire is reignited.

It has been found that the foregoing difficulties can be overcome by adding to the sodium chloride a quantity of diammonium hydrogen phosphate.

Accordingly, an object of the present invention is to provide an improved composition for and method of extinguishing fires of a mass of light metal particles.

Another object is to provide such a composition which is economical to compound.

A further object is to provide such a composition which effectively penetrates a mass of burning light metal particles of several inches in depth.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a composition consisting essentially of a mixture of between about 45% and about 80% by weight sodium chloride, and between about 55% and about 20% by weight diammonium hydrogen phosphate. To this mixture may be added up to about 30 parts by weight of a refractory material.

The relative proportion of the foregoing materials is not too critical. However, the ratio of sodium chloride to diammonium hydrogen phosphate must be within limits so that sufficient sodium chloride is present to form a crust or gloss on the particles and so that sufficient diammonium hydrogen phosphate is present to act as a carrier for the sodium chloride to penetrate the burning mass in the manner described hereinafter.

The amount of refractory material likewise may be varied. Sufficient of such material to form a surface blanket may be added where such effect is desired, but excessive amounts are not feasible because the effect of the sodium chloride would be minimized. Examples of such refractory materials are flint, graphite and silicon carbide. Also, mixtures of steatite, flint and feldspar in the following amounts by weight may be utilized:

| Mixture No. | Steatite | Flint | Feldspar |
|---|---|---|---|
| | Percent | Percent | Percent |
| 1 | 5 | 25 | 70 |
| 2 | 25 | 5 | 70 |
| 3 | 40 | 10 | 50 |

Graphite is preferred because it is not abrasive and can be used on machinery without damaging the same.

A metallic soap may be added to the basic mixtures in amounts sufficient to render the mixtures free flowing and to prevent caking thereof on prolonged storage when it is desired to discharge the mixtures from a container by gas under pressure in the form of a stream adapted to be directed on the fire. Between about 4% and about 8% by weight of the mixture of a finely divided, water insoluble metallic salt of a saturated fatty acid having from 12 to about 18 carbon atoms provides the desired effect.

Examples of such soaps are aluminum, barium, calcium, magnesium and zinc salts of lauric, myristic, palmitic and stearic acids. Barium stearate is preferred because it can withstand temperatures from —65° to 165° F.

In order to demonstrate the present invention, the following mixtures were prepared, the amounts indicated being parts by weight.

| Example No. | Sodium Chloride | Diammonium Hydrogen Phosphate | Graphite |
|---|---|---|---|
| 1 | 80 | 20 | 0 |
| 2 | 75 | 25 | 0 |
| 3 | 70 | 30 | 0 |
| 4 | 65 | 35 | 0 |
| 5 | 60 | 40 | 0 |
| 6 | 55 | 45 | 0 |
| 7 | 50 | 50 | 0 |
| 8 | 45 | 55 | 0 |
| 9 | 60 | 40 | 5 |
| 10 | 60 | 40 | 10 |
| 11 | 60 | 40 | 15 |
| 12 | 60 | 40 | 20 |
| 13 | 60 | 40 | 25 |
| 14 | 60 | 40 | 30 |

These mixtures were tested by distributing about two pounds of each on blazing fires consisting of a mass of about one and one-half pounds of magnesium chips having a depth of about one inch and an area of about 450 square inches. In each instance, the flame was knocked down and the fire was completely extinguished within about ten seconds after the fire extinguishing composition was deposited thereon.

It appeared that the diammonium hydrogen phosphate melted almost instantly and flowed down into the mass of chips carrying with it the sodium chloride which then fused and together with the phosphate salt glossed over the chips to extinguish the same. The mixtures penetrated to the bottom portion of the mass which when raked to the surface was found to be completely extinguished.

The mixture in accordance with Example 1 did not penetrate as well as the mixtures in accordance with the other examples, thereby demonstrating that a sufficient quantity of the phosphate salt is required to act as a carrier for the sodium chloride. The mixtures in accordance with Examples 7 and 8 appear to be a little slower in knocking down the flame than the mixtures in accordance with the other examples, thereby demonstrating that a sufficient quantity of sodium chloride is required to quench the fire.

The function of the refractory material for example graphite, is to blanket the surface and initiate temperature reduction of the burning mass. The mixture in accordance with Example 9 exhibited very little such effect, while the mixtures in accordance with Examples 10, 11 and 12 exhibited a very noticeable blanketing effect without interfering with the functioning of the sodium chloride and phosphate salt. The mixtures in accordance with Examples 13 and 14 had a very strong blanketing effect but the glossing action of the other materials was somewhat less effective.

*Example 15*

Another mixture was prepared comprising the following materials in the approximate proportions by weight as indicated:

| | Percent |
|---|---|
| Sodium chloride | 48 |
| Diammonium hydrogen phosphate | 35 |
| Graphite | 11 |
| Barium stearate | 6 |

About four pounds of this mixture were placed in a dry powder type fire extinguisher which was then pressurized to about 150 pounds per square inch with nitrogen. A fire of the same character as previously indicated was started and a sufficient quantity of this mixture was discharged thereon to extinguish the same. It was found that about two pounds of the mixture were required to completely extinguish the burning mass of magnesium chips throughout.

From the foregoing tests, it appears that the diammonium hydrogen phosphate by reason of its lower melting point runs down into the material carrying with it some of the sodium chloride (and refractory material when included). These materials penetrate to the depths of the burning mass, that is, to the last burning layer. Any material which is volatilized causes temperature reduction. The sodium chloride by having a higher melting point fuses at a higher temperature thereby stopping combustion, cools the mass, and finally, together with the phosphate salt, glosses over the chips. The mixtures in accordance with the present invention fuse all the hot and burning metal and quench the same. When the mass is disturbed to expose the portions below the surface to a fresh supply of air, the mass does not reignite.

In order to demonstrate the superiority of the foregoing mixtures over sodium chloride alone, about two pound of sodium chloride were thrown on a fire of the same character as previously indicated herein, and about two pounds of sodium chloride were discharged on a like fire in the manner described in connection with Example 15. In both cases, the fire was extinguished on the surface, but upon raking or disturbing the mass, the chips below the surface burst into flame to reignite the mass thereby showing that sodium chloride alone does not penetrate the mass throughout.

Other tests were conducted using other phosphates such as calcium phosphate, tripotassium phosphate trisodium phosphate, tetrasodium potassium tripolyphosphate and trisoduim dipotassium tripolyphosphate. These materials did not perform like the diammonium hydrogen phosphate and in some cases actually intensified the fire.

It will be understod that the details and examples hereinbefore set forth are illustrative only and that the invention as broadly described and claimed is in no way limited thereby.

We claim:

1. A composition for extinguishing light metal fires which consists essentially of a mixture of between about 45 and about 80 parts by weight sodium chloride, and between about 55 and about 20 parts by weight diammonium hydrogen phosphate.

2. A composition for extinguishing light metal fires which consists essentially of a mixture of between about 45 and about 80 parts by weight sodium chloride, between about 55 and about 20 parts by weight diammonium hydrogen phosphate, and up to about 30 parts by weight refractory material.

3. A composition for extinguishing light metal fires which consists essentially of a mixture of between about 45 and about 80 parts by weight sodium chloride, between about 55 and about 20 parts by weight diammonium hydrogen phosphate, up to about 30 parts by weight refractory material, and between about 4 and about 8 parts by weight of a finely divided, water insoluble metallic salt of a saturated fatty acid having from 12 to about 18 carbon atoms.

4. A composition for extinguishing light metal fires which consists essentially of a mixture of the following materials in the approximate proportions by weight as indicated:

| | Percent |
|---|---|
| Sodium chloride | 48 |
| Diammonium hydrogen phosphate | 35 |
| Graphite | 11 |
| Barium stearate | 6 |

5. The method of extinguishing a fire of a mass of light metal particles which method comprises applying to the burning metal in a quantity sufficient to extinguish the fire a composition consisting essentially of a mixture of between about 45 and about 80 parts by weight sodium chloride, and between about 55 and about 20 parts by weight diammonium hydrogen phosphate, the extinguishment of the fire being characterized in that the diammonium hydrogen phosphate melts sooner than the sodium chloride and flows down into the mass of particles carrying with it sodium chloride, whereby the mass of particles is penetrated by the composition and does not reignite.

References Cited in the file of this patent

UNITED STATES PATENTS

| 2,388,014 | Sargent et al. | Oct. 30, 1945 |
| 2,631,977 | Allen et al. | Mar. 17, 1953 |

FOREIGN PATENTS

| 543,703 | Great Britain | Mar. 9, 1942 |